United States Patent
Morreale

(10) Patent No.: US 11,306,811 B2
(45) Date of Patent: Apr. 19, 2022

(54) LUBRICATION FOR A PLANETARY GEARSET

(71) Applicant: SAFRAN AIRCRAFT ENGINES, Paris (FR)

(72) Inventor: Serge René Morreale, Moissy-Cramayel (FR)

(73) Assignee: SAFRAN AIRCRAFT ENGINES, Pairs (FR)

( * ) Notice: Subject to any disclaimer, the term of this patent is extended or adjusted under 35 U.S.C. 154(b) by 175 days.

(21) Appl. No.: 16/605,080

(22) PCT Filed: Mar. 19, 2018

(86) PCT No.: PCT/FR2018/050657
§ 371 (c)(1),
(2) Date: Oct. 14, 2019

(87) PCT Pub. No.: WO2018/189442
PCT Pub. Date: Oct. 18, 2018

(65) Prior Publication Data
US 2021/0102618 A1 Apr. 8, 2021

(30) Foreign Application Priority Data
Apr. 14, 2017 (FR) .................. 1753294

(51) Int. Cl.
*F16H 57/04* (2010.01)
*F01D 25/18* (2006.01)
(Continued)

(52) U.S. Cl.
CPC ......... *F16H 57/0427* (2013.01); *F01D 25/18* (2013.01); *F16H 1/28* (2013.01);
(Continued)

(58) Field of Classification Search
CPC ...... F16H 57/0427; F16H 1/28; F16H 57/046; F16H 57/0479; F01D 25/18
See application file for complete search history.

(56) References Cited

U.S. PATENT DOCUMENTS 7,591,754 B2 * 9/2009 Duong .................. F02C 7/36
475/347
8,876,647 B2 * 11/2014 Gallet .................. F16H 57/042
475/159

(Continued)

FOREIGN PATENT DOCUMENTS

FR 2 987 416 8/2013
FR 3 041 054 3/2017

(Continued)

OTHER PUBLICATIONS

International Patent Application No. PCT/FR2018/050657, International Search Report and Written Opinion dated Jun. 11, 2018, 10 pgs. (relevance in citations and English translation of ISR).

*Primary Examiner* — Derek D Knight
(74) *Attorney, Agent, or Firm* — Lathrop GPM LLP

(57) ABSTRACT

The invention concerns an epicycloidal gear train comprising a central pinion (26), an outer crown (28) and satellite pinions (32) in engagement with the central pinion (26) and the outer crown (28) and each mounted freely rotatable on a satellite carrier (36), the gear train (10) comprising means for lubricating the teeth and axes (34) of the satellite pinions (32), these means including an annular cup (56) integral with the satellite carrier (36) opened radially inward. According to the invention, an annular bailer (64) is arranged radially inside the cup (56) and applied annularly sealingly to it, the annular bailer (64) being fixed in rotation to the central pinion (26).

22 Claims, 3 Drawing Sheets

(51) Int. Cl.
*F16H 1/28* (2006.01)
*F16H 57/08* (2006.01)

(52) U.S. Cl.
CPC ....... *F16H 57/046* (2013.01); *F16H 57/0479* (2013.01); *F16H 57/0486* (2013.01); *F16H 57/082* (2013.01); *F05D 2260/40311* (2013.01); *F05D 2260/98* (2013.01)

(56) References Cited

U.S. PATENT DOCUMENTS

| | | |
|---|---|---|
| 11,131,249 B2 * | 9/2021 | Di Giovanni ......... F16C 37/007 |
| 2009/0179387 A1 * | 7/2009 | Saenz De Ugarte .. F16J 15/441 277/563 |
| 2009/0247347 A1 * | 10/2009 | Choi ................... F16H 57/0482 475/159 |
| 2013/0225353 A1 | 8/2013 | Gallet et al. |
| 2021/0148453 A1 * | 5/2021 | Pennacino .......... F16H 57/0427 |
| 2021/0189970 A1 * | 6/2021 | Morreale ............ F16H 57/0479 |

FOREIGN PATENT DOCUMENTS

| | | |
|---|---|---|
| WO | WO2010092263 | 8/2010 |
| WO | WO2013124590 | 8/2013 |

* cited by examiner

LUBRICATION FOR A PLANETARY GEARSET

CROSS-REFERENCE TO RELATED APPLICATIONS

This application is a 35 U.S.C. § 371 filing of International Application No. PCT/FR2018/050657 filed Mar. 19, 2018, which claims the benefit of priority to French Patent Application No. 1753294 filed Apr. 14, 2017, each of which is incorporated herein by reference in its entirety.

The field of the present invention is that of turbomachinery and more particularly epicycloidal gear trains and among epicycloidal gear trains more specifically epicycloidal reducers and differential transmissions.

Typically, an epicycloidal gear train reducer consists of a planetary or central pinion, a planetary crown or outer crown and satellite pinions that are in engagement with the planetary pinion and the crown, the support of one of these three components being locked in rotation for the operation of the gear train. When the satellite carrier is fixed in rotation, the central pinion and crown are driving and driven, respectively, or vice versa. The lubrication and cooling of the gears and axes of the satellite pinions are then not a problem and are ensured by nozzles that are fixed in rotation and can project oil permanently on the meshing areas of the satellite pinions with the central pinion and with the crown and on the satellite pinion axes.

However, in the most frequent case, the outer crown is fixed in rotation and the central pinion and the satellite carrier are driving and driven, respectively. This type of set-up is preferred in cases where a reduction ratio of more than three is desired since it is less cumbersome. Lubrication of the meshing zones and satellite pinion axes is then a problem that is solved in current technology by complex networks of pressurized oil routing pipes, using dynamic seals or rotating joints that are subject to wear and which must be checked and replaced regularly.

To avoid the use of rotary joints, the applicant proposed in her application WOA12010092263 a lubrication device in which a fixed injector sprays oil into an annular cup fixed to a satellite carrier, the oil being thus recovered by centrifugation and then directed to means for lubricating the pinions.

This device greatly improves the reliability of the reducer lubrication system, as well as its maintenance. However, this device induces a dependence of the supply pressure of the lubrication means of the satellite carrier pinions on the compression that can be created between the annular cup and the lubrication means, because the spray oil supply causes a pressure failure in the lubrication circuit. In a known manner, the oil supply means are configured to provide an oil flow proportional to the rotational speed of a turbomachine shaft, for example the high-pressure compressor shaft that does not drive the central pinion of the gear train. Thus, at high rotational speeds, the oil flow is high and can be sent by centrifugation to the gears and axes of the satellite carrier. However, at low speed, the lower oil flow rate cannot be properly centrifuged by the cup due to its low rotational speed. As a result, there is insufficient oil supply during idling phases, which can lead to damage to the teeth of the satellites, outer crown and central pinion due to lack of lubrication and cooling. The oil supply failure is more critical for the satellite pinions, the outer crown and the central pinion than for the satellite axes since the outputs of the satellite gear oil supply lines, outer crown and central pinion are located at a smaller radius than the outputs of the satellite axis oil supply lines, resulting in a lower supply pressure. Finally, the lack of oil centrifugation at low rpm can lead to an accumulation of oil in the annular cup inducing an oil overflow from the cup into the enclosure that houses it.

Similarly, in another known configuration, the nozzle can be carried by the shaft carrying the central pinion so that its oil jet is directed towards the cup. This assembly suffers from the same difficulties as mentioned with a fixed nozzle assembly.

The purpose of the invention is in particular to provide a simple, effective and economical solution to the problems of the prior art described above.

To this end, it offers an epicycloidal gear train comprising a central pinion, an outer crown and satellite pinions in engagement with the central pinion and the outer crown and each mounted to be freely rotatable on a satellite carrier, the gear train comprising gear and satellite pinion axis lubrication means, these means comprising an annular cup fixed to the satellite carrier which is open radially towards the inside, characterised in that an annular bailer is arranged radially inside the cup and applied annularly sealed to it, the annular bailer being fixed in rotation to the central pinion.

The integration of an annular bailer attached to the central pinion allows the oil recovered by the bailer to be centrifuged at a higher speed than that of the satellite carrier, which increases the oil pressure of the cup supply compared to the previous technique and thus ensures a better oil supply to the teeth and axes of the satellites when operating at low satellite carrier rotation speed.

According to another characteristic of the invention, the annular bailer comprises two annular flanks connected radially outwards by a radially outer bottom wall with oil passage openings to the cup. In addition, the sides can converge towards each other towards the back wall.

The cup can include two radial annular walls whose radially inner ends are supported on annular seals mounted in annular grooves in the annular bailer.

Ring seals are, for example, split annular seals mounted circumferentially prestressed in the ring grooves. These annular seals are usually called segments. This circumferential compression assembly of the seals in the grooves makes it possible to make them integral when rotating the cup.

When the central pinion is driven in rotation by the shaft of a low-pressure compressor, it is possible to distinguish two situations, a first one corresponding to a low rotational speed of the low-pressure compressor shaft and a second one corresponding to a high rotational speed of the low-pressure compressor shaft.

In the first situation, the low rotational speed of the shaft induces a low rotation of the satellite carrier so that oil accumulates in the annular cup and in the annular bailer, which induces a pressurization of the seals on the sides of the annular grooves of the annular bailer. In the second situation, the high rotational speed of the compressor shaft induces a high rotation of the satellite carrier, as the oil no longer accumulates in the annular bailer, and avoids pressurizing the seals on the sides of the grooves of the annular bailer. Thus, the sealing provided for with the assembly according to the invention allows to limit the wear of the seals only to phases with low rotational speed corresponding to phases of idling, which is not the case with the previous technique in which the seals are subjected to permanent wear.

The annular bailer can comprise a plurality of circumferentially spaced axial partitions and delimiting a plurality of independent circumferential cavities. This allows to increase the mechanical strength of the bailer during operation. In addition, these partitions also allow a better drive in rotation of the oil.

The bailer can still include a plurality of circumferentially spaced blade pairs, the blades of a given torque extending axially opposite each other from a flank of the annular bailer. In this embodiment, the axial extent of the fins is limited and they do not touch each other so that the oil projections outside the bailer are reduced compared to the embodiment with partitions.

The invention also concerns a turbomachine comprising a gear train reducer whose central pinion surrounds and is rotationally fixed to a shaft of the turbomachine, and first fixed oil spraying means arranged radially outside the shaft and having at least one oil jet projecting oil towards the shaft in the annular space between the annular bailer and the shaft.

The oil is sprayed directly onto the shaft, then flows into the bailer and then into the cup to feed the teeth and axes of the satellite pinions.

In a particular configuration of the invention, the shaft carries an annular oil deflection wall protruding radially outwardly on the shaft and positioned axially opposite the annular bailer, the oil nozzle being oriented so as to project oil towards said deflection wall.

When the gear train reducer is mounted in a turbomachine, it is arranged in an annular chamber formed radially inside a low-pressure compressor, the satellite carrier being connected to an upstream fan wheel and the shaft being a shaft of the low-pressure compressor.

Preferably, the gear train reducer is inserted axially between an upstream and a downstream bearing supported by a stator structure of the low-pressure compressor, the upstream bearing guiding in rotation a connecting shaft from the fan wheel to the satellite carrier and the downstream bearing guiding in rotation the shaft of the low-pressure compressor.

According to another characteristic of the invention, the first fixed oil spraying means are integrated into an oil circuit further comprising second oil spraying means on the upstream and downstream bearing and a pump for simultaneous feeding of the first and second oil spraying means.

The invention is, for example, applicable to a gear train, such as a gear train in which the outer crown is fixed. In this case, the gear train can be qualified as a reducer since the output speed, i. e. that of the satellite carrier, is lower than the input speed, i. e. that of the rotating drive shaft of the central pinion. The invention also concerns a differential transmission gear train, in which the satellite carrier and the outer crown are movable in rotation in opposite directions, the satellite carrier preferably driving a first upstream fan wheel and the outer crown preferably driving a second downstream fan wheel. With such an arrangement, a double counter rotative fan assembly is obtained.

The invention will be better understood, and other details, characteristics and advantages of the invention will appear upon reading the following description given by way of a non restrictive example while referring to the appended drawings wherein.

Figure 1A:
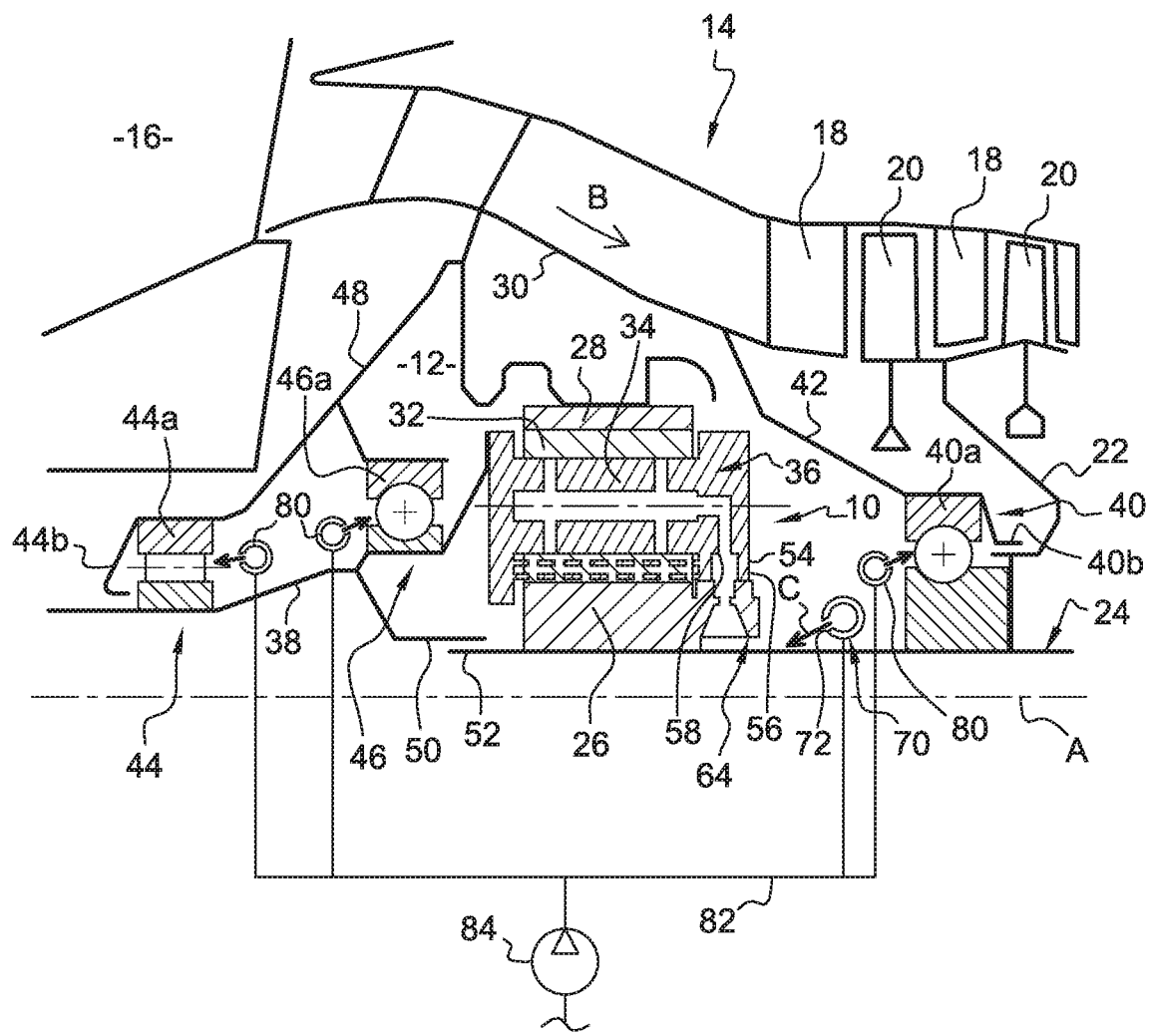
FIG. 1A is a schematic half-view in axial section of an epicycloidal gear train reducer in a turbomachine according to the invention.

First of all, we refer to FIG. 1A, which schematically represents a reducer 10 according to the invention, with epicycloidal gear trains mounted in a turbomachine such as an aircraft turbojet. Specifically, the gear train 10 is mounted in a radially formed annular chamber 12 inside a low-pressure compressor 14 arranged downstream of a fan wheel 16 and upstream of a high-pressure compressor (not shown). The low-pressure compressor 14 comprises a plurality of rows of fixed vanes 18 and annular rows of moving vanes 20 arranged axially, along the A axis, alternately. The rows of moving vanes 20 are connected by an annular wall 22 to a low-pressure shaft 24, which also rotates the vanes of a downstream low-pressure turbine (not shown).

The gear train reducer 10 comprises a central pinion 26 or planetary pinion surrounding the upstream end of the shaft 24 of the low-pressure compressor and integral with it, an outer crown 28 or planetary crown surrounding the central pinion 26 and fixedly connected to an annular wall 30 defining internally the annular flow vein of the primary air flow (arrow B) flowing in the low-pressure compressor 14. The reducer 10 also includes satellite pinions 32 which are engaged by their teeth with gears of the central pinion 26 and the outer crown 28. These satellite pinions 32 are mounted freely rotating on axes 34 of a satellite carrier 36 whose upstream end is connected by a connecting shaft 38 to the fan wheel 16.

The shaft 24 of the low-pressure compressor 14 is supported and guided in rotation by a downstream ball bearing 40 whose outer crown 40a is fixed to a first stator part 42 of the low-pressure compressor 14 connected externally to the inner annular wall 30 of the primary air vein. The connecting shaft 38 is supported and guided in rotation by two bearings 44, 46 arranged upstream of the gear train reducer 10, a first bearing 44 of which is arranged upstream of a second bearing 46 is a roller bearing, the second bearing 46 being a ball bearing. The outer crowns 44a, 46a of the first and second bearings are supported by a second stator part 48 of the low-pressure compressor connected externally to the inner annular wall 30 of the primary air vein.

The annular enclosure 12 of the epicycloidal gear train reducer 10 is thus delimited radially inwardly by the shaft 24 of the low-pressure compressor 14, radially outwardly by the first 42 and second 48 stator parts and the inner annular wall 30 of the primary air vein, upstream by the first upstream bearing 44 and downstream by the downstream bearing 40. It should be noted that the connecting shaft 38 also includes an annular wall 50 that cooperates sealingly with the upstream end 52 of the shaft 24 of the low-pressure compressor 14 to prevent lubricating oil leaks at this point. Similarly, to limit oil leaks, the outer ring 44a of the first upstream bearing 44 and the outer crown 40a of the downstream bearing 40 each have an annular portion 44b, 40b sealingly cooperating with the connecting shaft 38 and the shaft 24 of the low-pressure compressor 10, respectively.

The rotation of the satellite pinions 32 in the axes 34 of the satellite carrier is carried out by means of plain bearings.

The epicycloidal gear train reducer 10 includes means for lubrication by oil spraying on the gear teeth of satellite pinions 32 and their axes 34, these means essentially comprising an oil receiving impeller 54 having an annular cup 56, more particularly circular in shape. The cup 56 has a U-shaped section here, the opening of which faces radially inwards, i. e. in the direction of the axis of rotation A. The cup 56 of the impeller 54 has a bottom wall 58 with holes, some of which are connected to oil supply lines 60 of the axes 34 of the satellite pinions 32 and others of which are connected to oil supply lines 62 of the contact areas between the teeth of the satellite pinions 32 and the teeth of the central pinion 26 (FIG. 1B).

Figure 1B:
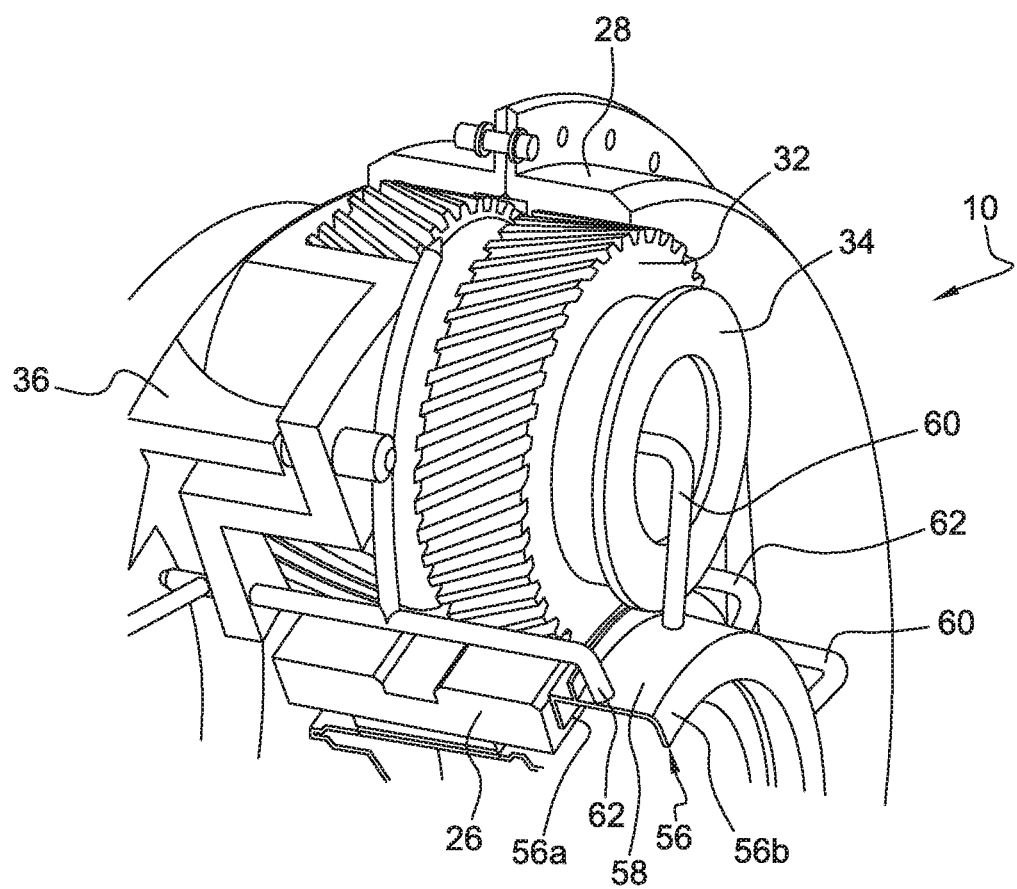
FIG. 1B is a schematic perspective truncated view of the gear train reducer and of the satellite lubrication means.

According to the invention, an annular oil recovery bailer 64 is applied annularly sealingly to the radially inner periphery of the cup 56 (the annular bailer is not shown in FIG. 1B). More precisely and with reference to FIGS. 2 to 5, the cup 56 comprises two upstream radial annular walls 56a and downstream 56b whose radially inner ring edges 56c, 56d are sealingly connected to radially outer ring edges 64c, 64d of two upstream and downstream annular walls 64a, 64b defining axially an oil recovery passage of the ring bailer 64. The wall 64b is connected radially inward to the shaft 24 so as to form an annular shoulder. To achieve a watertight joint, the radially outer edges 64c, 64d of the annular walls 64a, 64b of the bailer 64 each include an annular groove 66 receiving a split annular seal 68. Each split annular seal 68 is mounted circumferentially prestressed in an annular groove 66 of bailer 64 so that in operation the annular seals 68 are integral with the radially inner ends 56c, 56d of the radial annular walls 56a, 56b of the cup 56 and rubs on a lateral flank of a groove 66 of the ring bailer 64 when the speed of rotation is low and the bailer is filled with oil. The friction of the upstream joint occurs on the upstream flank of the upstream groove formed in the annular wall 64b. The friction of the downstream joint occurs on the downstream flank of the downstream groove formed in the annular wall 64a.

According to the invention, the turbomachine includes first fixed oil spraying means 70 comprising a plurality of oil nozzles 72 distributed around the A axis which are connected to a pump and an oil tank (FIG. 1A). According to an embodiment of the invention, oil nozzles 72 are orifices arranged on a ring surrounding the shaft 24 of the low-pressure compressor 14.

The diameter of the nozzle 72 must be greater than the maximum diameter of the particles likely to block the nozzles. The diameter must also be large enough to ensure a flow of oil to the cup 56 and energetic enough to be straight over a distance of about 5 cm. In a practical embodiment of the invention, the oil spraying means are configured to have an outlet pressure of about 1 bar in the least favourable regimes such as idling. If you want to move the nozzle 66 away from the shaft 24, then the oil pressure must be increased.

These nozzles 72 are oriented so that their oil jets (arrow C in FIGS. 1A and 2) project oil into the annular space between the shaft 24 and the bailer 64 so that the oil is recovered by the bailer 64 and precentrifuged in the bailer 64 before passing into the cup 56. This ensures a good oil supply to the impeller 54 even when the shaft speed 24 is low and the oil flow is low. Indeed, in the assembly described above, the central pinion 26 is connected to the shaft 24 of the low-pressure turbine and rotates faster than the satellite carrier 36 carrying the cup 56. The oil spray on shaft 24 allows an initial centrifugation of the oil on shaft 24 and in the bailer 64, inducing an increase in the oil pressure before its introduction into the cup 56 of the satellite carrier 36 compared to the oil pressure achievable if the oil was projected directly into the cup 56.

Figure 2:
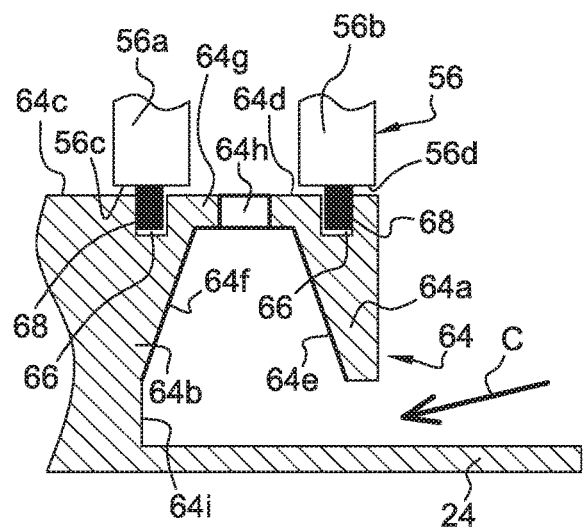
FIGS. 2 to 5 are schematic views of different embodiments of an annular bailer integrated into a gear train reducer according to the invention.

As it is better visible in FIG. 2 and following, the bailer 64 includes an annular oil receiving cavity which is delimited by two annular flanks 64e, 64f forming respectively the inner faces of the radial annular walls 64a, 64b of the annular bailer 64. These annular flanks 64e, 64f converge radially outwards towards each other towards an outer annular bottom wall 64g which includes oil passage orifices 64h to the annular cup 56. The annular flanks 64e, 64f are inclined obliquely to a radial plane separating the two annular flanks 64e, 64f. The annular flanks 64e, 64f can be substantially symmetrical to each other with respect to this radial plane. In all configurations, the upstream flank 64f is truncated with an increasing cross-section downstream and the downstream flank 64e is truncated with an increasing cross-section upstream. The upstream flank 64f extends radially inwards by a substantially radial annular surface 64i, so as to allow the oil flowing on the shaft 24 to be recovered and guided towards the upstream flank 64f of the bailer 64.

Figure 3:
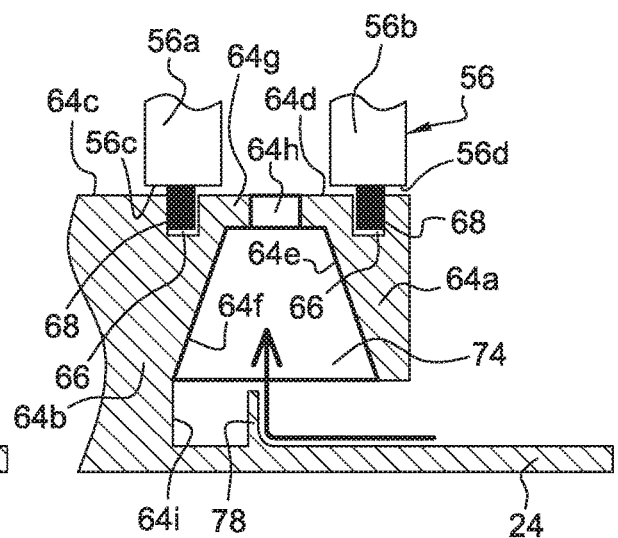

In a second embodiment of the annular bailer 64 shown in FIG. 3, sides 64e, 64f of the bailer 64 are connected by axial partitions 74 spaced circumferentially from each other so as to delimit independent circumferential cavities or troughs.

Figure 4:
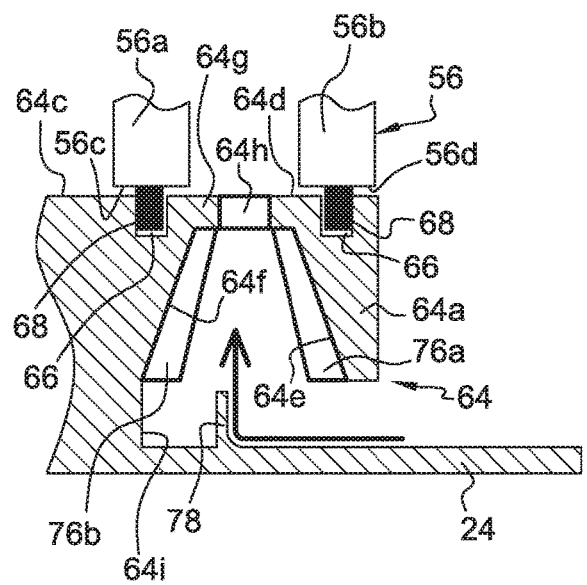

In a third embodiment of the annular bailer 64 shown in FIG. 4, fin pairs 76a, 76b are formed in the cavity of the bailer 64. Each fin pair 76a, 76b includes a first fin 76a extending downstream from the upstream flank 64f of the annular bailer 64 and a second fin 76b extending upstream from the downstream flank 64e of the annular bailer 64. Fins 76a, 76b extend axially opposite each other without the free ends of the fins touching each other. The axial extent of the fins 76a, 76b is limited so as to reduce parasitic oil projections outside the annular bailer 64.

Figure 5:
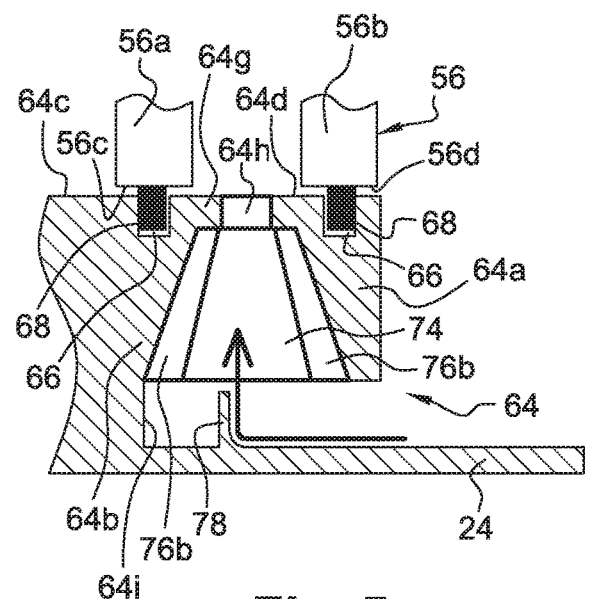

The fourth embodiment, shown in FIG. 5, corresponds to a bailer 64 integrating both fins 76a, 76b and partitions 74. This embodiment improves the mechanical strength of the bailer while limiting splashes.

It should be noted that the embodiment of FIG. 2 offers reduced mechanical strength compared to the embodiments in FIGS. 3, 4 and 5 but does not include any obstacle to the entry of oil into the bailer at low operating speed, as is the case in the embodiments in FIGS. 4 and 5. The embodiment of FIG. 3 offers better mechanical resistance than the other embodiments as well as good centrifugation at high speed but hinders the flow of oil at high operating speed, which can lead to oil splashes at the inlet of the bailer.

In other possible embodiments, the fins could be U-shaped or V-shaped.

To ensure an optimal oil supply to the annular cup 56, the oil jets of the nozzles 72 should preferably aim at an impact point on the shaft 24 which is located axially between the two annular walls 64b, 64a of the bailer, preferably between the annular rib 78 and the downstream annular wall 64a of the bailer 64. The direction of an oil jet from a nozzle 72 therefore includes a non-zero axial component directed from the nozzle 72 to the bailer 56 and a non-zero radial component directed from the nozzle 72 to the shaft 24.

According to an embodiment, the direction of each of the jets of the nozzles 72 can be entirely included in a plane containing the axis of rotation A of the shaft 24. The direction of the oil jets may preferably include a non-zero tangential component directed in a direction of rotation of the shaft 24 in order to facilitate the rotational drive of the oil. The oil impacting the shaft 24 has thus a non-zero tangential speed, which reduces the tangential speed difference between the oil and the shaft 24, thus limiting splashes.

As shown in FIGS. 3, 4 and 5, the shaft 24 can carry an annular wall 78 deflecting the oil to the annular bailer 64. This annular wall 78 is arranged axially in line with the annular bailer 64. The face of the deflection wall 78 impacted by the oil could have a concave curved shape, optimized to allow a good redirection of the oil towards the annular bailer 64 while limiting parasitic oil projections.

Finally, with reference to FIG. 1, the turbomachine also includes second oil spraying means 80 on the upstream rolling bearings 44, 46 and downstream bearing 40. These first 70 and second 80 oil spraying means are integrated into the same oil circuit 82 which also includes a pump 84.

This pump 84 simultaneously supplies the first oil spraying means 70 supplying the epicycloidal gear train reducer 10 and the second bearing means 40, 44, 46.

Thus, the assembly according to the invention of an annular bailer fixed to the shaft allows to ensure a centrifugation of the oil at low speed and it is possible to have a feed pump whose operating speed does not need to be a function of the rotational speed of the shaft 24 driving the central pinion. In a particular configuration, the operating speed of the pump can also be chosen to be dependent on the speed of a high-pressure shaft of the turbomachine such as the high-pressure compressor shaft.

The invention claimed is:

1. An epicycloidal gear train comprising a central pinion, an outer crown and satellite pinions in engagement with the central pinion and the outer crown and each mounted freely rotatable on a satellite carrier, the train comprising means for lubricating teeth and axes of the satellite pinions, these means comprising an annular cup integral with the satellite carrier opened radially inwardly, characterized in that an annular bailer is arranged radially inside the cup and applied annularly sealingly thereto, the annular bailer being integral with the central pinion in rotation and an annular space being defined between a shaft and the annular bailer.

2. The gear train according to claim 1, characterized in that the annular bailer comprises two annular flanks connected radially outwardly by a radially outer bottom wall having oil passage orifices to the cup.

3. The gear train according to claim 2, characterized in that the flanks converge towards each other towards the bottom wall.

4. The gear train according to claim 1, characterized in that the cup comprises two radial annular walls whose radially inner ends are supported on annular seals mounted in annular grooves of the annular bailer.

5. The gear train according to claim 4, characterized in that the annular seals are split annular seals mounted circumferentially prestressed in the annular grooves.

6. The gear train according to claim 2, characterized in that the cup comprises two radial annular walls whose radially inner ends are supported on annular joints mounted in annular grooves of the annular bailer.

7. The gear train according to claim 3, characterized in that the cup comprises two radial annular walls whose radially inner ends are supported on annular joints mounted in annular grooves of the annular bailer.

8. The gear train according to claim 1 characterized in that the annular bailer comprises a plurality of circumferentially spaced axial partitions and delimiting a plurality of independent circumferential cavities.

9. The gear train according to claim 2 characterized in that the annular bailer comprises a plurality of circumferentially spaced axial partitions and delimiting a plurality of independent circumferential cavities.

10. The gear train according to claim 3 characterized in that the annular bailer comprises a plurality of circumferentially spaced axial partitions and delimiting a plurality of independent circumferential cavities.

11. The gear train according to claim 1, characterized in that the bailer comprises a plurality of circumferentially spaced fin pairs, the fins of a given torque extending axially opposite each other from a flank of the annular bailer.

12. The gear train according to claim 2, characterized in that the bailer comprises a plurality of circumferentially spaced fin pairs, the fins of a given torque extending axially opposite each other from a flank of the annular bailer.

13. The gear train according to claim 3, characterized in that the bailer comprises a plurality of circumferentially spaced fin pairs, the fins of a given torque extending axially opposite each other from a flank of the annular bailer.

14. A turbomachine comprising a gear train according to claim 1, the central pinion of which surrounds and is rotationally fixed to a shaft of the turbomachine, and first fixed oil spraying means arranged radially outside the shaft and having at least one oil nozzle projecting oil towards the shaft in the annular space between the annular bailer and the shaft.

15. A turbomachine comprising a gear train according to claim 2, the central pinion of which surrounds and is rotationally fixed to a shaft of the turbomachine, and first fixed oil spraying means arranged radially outside the shaft and having at least one oil nozzle projecting oil towards the shaft in the annular space between the annular bailer and the shaft.

16. A turbomachine comprising a gear train according to claim 3, the central pinion of which surrounds and is rotationally fixed to a shaft of the turbomachine, and first fixed oil spraying means arranged radially outside the shaft and having at least one oil nozzle projecting oil towards the shaft in the annular space between the annular bailer and the shaft.

17. The turbomachine according to claim 14, characterized in that the shaft carries an annular oil deflection wall formed radially outwardly on the shaft and positioned axially opposite the annular bailer, the oil nozzle being oriented so as to project oil towards said deflection wall.

18. The turbomachine according to claim 17, characterized in that the gear train is mounted in an annular chamber formed radially inside a low-pressure compressor, the satellite carrier being connected to an upstream fan wheel and the shaft being a shaft of the low-pressure compressor.

19. The turbomachine according to claim 14, characterized in that the gear train is mounted in an annular chamber formed radially inside a low-pressure compressor, the satellite carrier being connected to an upstream fan wheel and the shaft being a shaft of the low-pressure compressor.

20. The turbomachine according to claim 19, characterized in that the gear train is axially interposed between an upstream bearing and a downstream bearing carried by a stator structure of the low-pressure compressor, the upstream bearing rotatably guiding a connecting shaft from the fan wheel to the satellite carrier and the downstream bearing rotatably guiding the shaft of the low-pressure compressor.

21. The turbomachine according to claim 20, characterized in that the first fixed oil spraying means are integrated into an oil circuit further comprising second oil spraying means on the upstream bearing and the downstream bearing and a pump for simultaneous feeding of the first and second oil spraying means.

22. The gear train according to claim 1, characterized in that the annular bailer is carried by the central pinion.

* * * * *